United States Patent
Ebert et al.

(10) Patent No.: US 12,235,179 B2
(45) Date of Patent: Feb. 25, 2025

(54) MULTI-DIRECTIONAL HIGH-RESOLUTION OPTICAL TACTILE SENSORS

(71) Applicant: The Regents of the University of California, Oakland, CA (US)

(72) Inventors: Frederik David Ebert, Berkeley, CA (US); Akhil Amar Padmanabha, San Jose, CA (US); Stephen Tian, San Jose, CA (US); Roberto Calandra, Fremont, CA (US); Sergey Vladimir Levine, Berkeley, CA (US)

(73) Assignee: The Regents of the University of California, Oakland, CA (US)

( * ) Notice: Subject to any disclaimer, the term of this patent is extended or adjusted under 35 U.S.C. 154(b) by 337 days.

(21) Appl. No.: 17/723,640

(22) Filed: Apr. 19, 2022

(65) Prior Publication Data

US 2023/0074958 A1     Mar. 9, 2023

Related U.S. Application Data

(63) Continuation of application No. PCT/US2020/056644, filed on Oct. 21, 2020.

(60) Provisional application No. 62/923,911, filed on Oct. 21, 2019.

(51) Int. Cl.
| | |
|---|---|
| *G01L 5/166* | (2020.01) |
| *B25J 13/08* | (2006.01) |
| *B25J 19/02* | (2006.01) |

(52) U.S. Cl.
CPC .............. *G01L 5/166* (2013.01); *B25J 13/084* (2013.01); *B25J 19/023* (2013.01)

(58) Field of Classification Search
CPC ................................ G01L 1/241; G01L 5/166
See application file for complete search history.

(56) References Cited

U.S. PATENT DOCUMENTS

| | | | |
|---|---|---|---|
| 7,420,155 B2 * | 9/2008 | Mizota | G01L 5/228 250/221 |
| 7,707,001 B2 * | 4/2010 | Obinata | G01N 19/02 702/41 |
| 11,703,321 B2 * | 7/2023 | Adelson | B25J 15/0009 356/513 |
| 2008/0027582 A1 | 1/2008 | Obinata et al. | |
| 2009/0315989 A1 | 12/2009 | Adelson | |
| 2019/0091871 A1 * | 3/2019 | Alspach | G01B 11/16 |

OTHER PUBLICATIONS

International Preliminary Report on Patentability and Written Opinion of the International Searching Authority, dated Apr. 26, 2022 in International Patent Application No. PCT/US2020/056644 filed Oct. 21, 2020.

* cited by examiner

*Primary Examiner* — Erika J. Villaluna
(74) *Attorney, Agent, or Firm* — Gerald T. Gray; Leydig, Voit & Mayer, LTD.

(57) ABSTRACT

Optical tactile sensors are provided that include a scaffolding structure, a transparent elastomer material covering at least an end portion of the scaffolding structure, and one or multiple cameras situated on the end portion of the scaffolding structure and embedded within the transparent elastomer material, wherein the one or multiple cameras are situated so as to provide an extended, e.g., up to 360°, field of view about the end portion of the scaffolding structure.

20 Claims, 10 Drawing Sheets

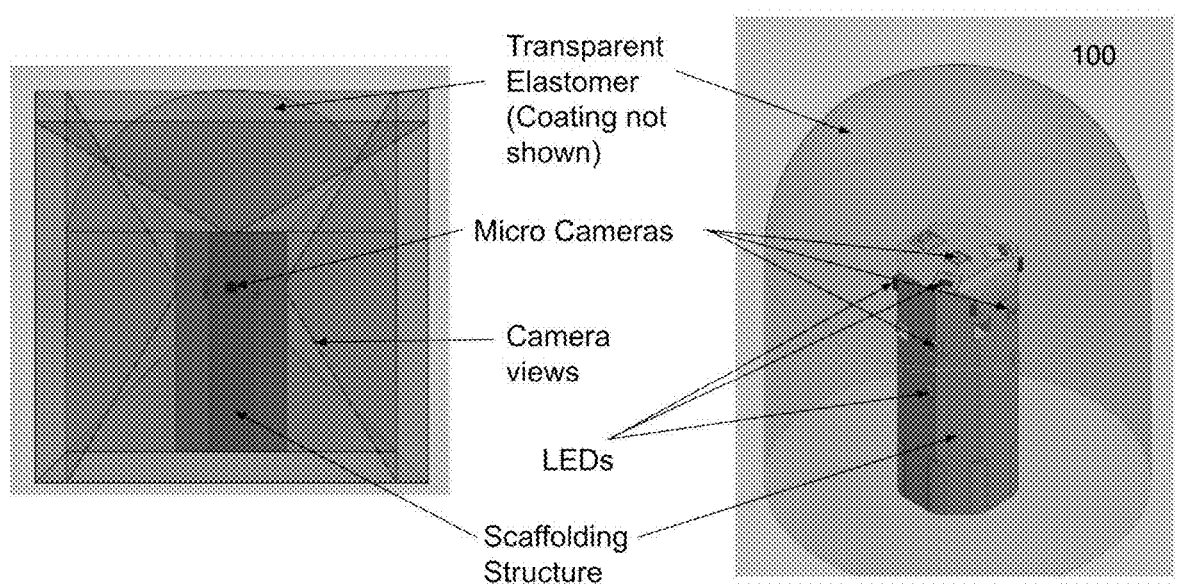
FIG 4A: Illustration of miniature tactile sensor design embodiment. Micro camera chips are integrated into a structure to provide a full 360 degree sensing capability on the robotic fingertip.

FIG. 5A
FIG. 5B
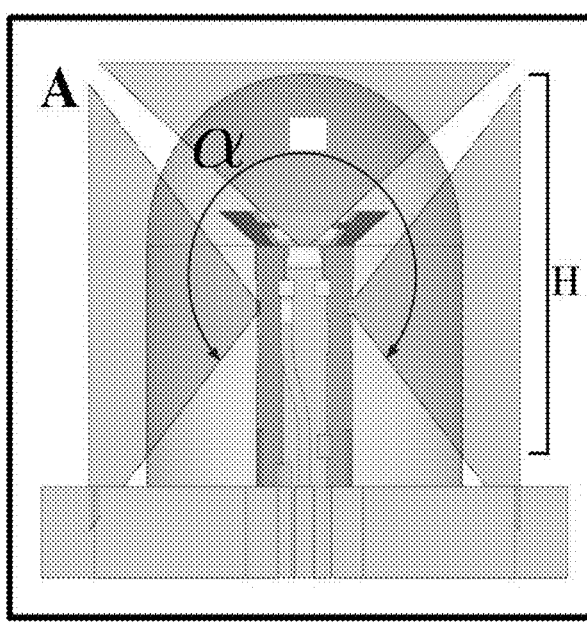
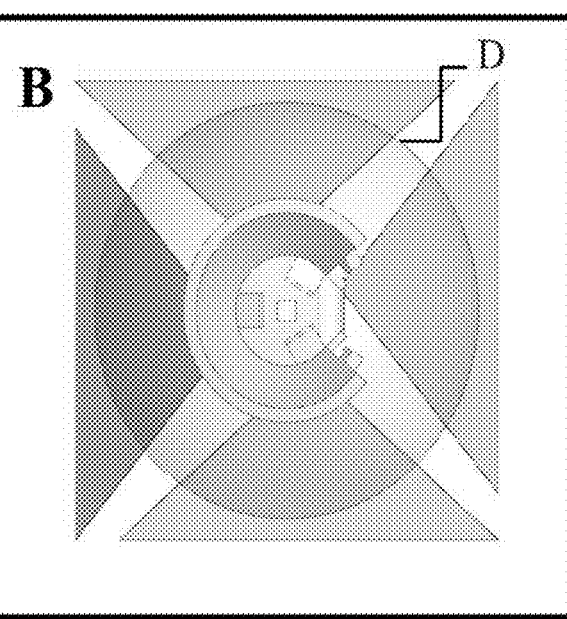

MULTI-DIRECTIONAL HIGH-RESOLUTION OPTICAL TACTILE SENSORS

CROSS REFERENCES TO RELATED APPLICATION

This patent application claims priority to International Patent Application No. PCT/US2020/056644, entitled, "MULTI-DIRECTIONAL HIGH-RESOLUTION OPTICAL TACTILE SENSORS," filed Oct. 21, 2020 and to U.S. Provisional Patent Application No. 62/923,911, entitled "MULTI-DIRECTIONAL HIGH-RESOLUTION OPTICAL TACTILE SENSORS," filed Oct. 21, 2019, both of which are incorporated herein by reference in their entirety.

STATEMENT REGARDING FEDERALLY SPONSORED RESEARCH AND DEVELOPMENT

This invention was made with Government support under NSF Grant 1700697. The Government has certain rights in this invention.

BACKGROUND

Robots manipulate objects by exerting forces on the objects. While 3-dimensional (3D) sensors and cameras can provide a global view of a scene, tactile sensing provides arguably the most direct information about the contact state, since tactile sensors can sense precisely those forces that the robot is exerting to manipulate objects. However, the design of effective tactile sensors for robotic manipulation has consistently proven challenging. For a tactile sensor to be useful in robotic manipulation, it should be compact enough to fit inside a robot finger, and it should provide a sufficiently rich signal such that relevant information about the contact state can be obtained. For general-purpose robotic manipulation, it is also important for the tactile sensor to include sensors covering as much of the finger's curved surface as possible, as the robot could contact the object in a variety of places.

Most current tactile sensors fall into either of two categories: sensors that provide high spatial resolution on a flat surface, as in the case of GelSight™ sensors, or sensors that may allow sensitivity on strongly curved surfaces, but with much lower spatial resolution. Curved sensor designs based on capacitive, resistive or optical sensor arrays typically have limited spatial resolution due to manufacturing constraints. High resolution tactile sensing is important for high-fidelity manipulation, while curved sensor surfaces allow use for a broader range of tasks and are well-suited for robotic hands.

SUMMARY

The present disclosure provides optical tactile sensors, and more particularly miniaturized optical tactile sensors having a multi-directional field of view.

The present embodiments provide optical tactile sensors based on optical sensing. In certain embodiments, micro-cameras are embedded into a piece of transparent deformable gel, where the cameras capture deformations of the gel in response to contacts providing a very rich signal from which a variety of contact state features can be inferred. For example, based on the camera image(s) it is possible to estimate the magnitude and direction of contact forces, determine the 3D geometry of an object at the contact point, detect slippage, while at the same time provide very high spatial accuracy. Various embodiments are advantageously durable, have a small form-factor, e.g., can easily fit into robot fingers sized similar to human fingers, or other robotic implements and are able to cover (e.g., sense over) non-flat surfaces.

In an embodiment, an optical tactile sensor is provided that includes a scaffolding structure, a transparent elastomer material (e.g., gel) covering and/or surrounding at least an end portion of the scaffolding structure (including covering and/or surrounding an end surface and at least a portion of one, some or all side surfaces of the scaffolding structure), and one or multiple cameras situated on the end portion of the scaffolding structure and embedded within the transparent elastomer material, wherein the one or multiple cameras are situated so as to provide an extended field of view, e.g., up to a 180° or up to a 270° or up to a 360° field of view, about the end portion of the scaffolding structure.

In an embodiment, the optical tactile sensor further includes one or more light sources situated on the end portion of the scaffolding structure and embedded within the transparent elastomer material, wherein the one or more light sources are configured to illuminate an interior of the transparent elastomer material, e.g., the interior volume of the gel. In certain aspects, the one or more light sources comprise one or more light emitting diodes (LEDs). In certain aspects, the one or more light sources are situated on a flexible PCB structure, and the flexible PCB structure is attached to the end portion of the scaffolding structure.

In an embodiment, the optical tactile sensor further includes a non-transparent material layer disposed on at least a portion of an outer surface of the transparent elastomer material. In certain aspects, the non-transparent material layer includes a fabric material.

In certain aspects, the one or multiple cameras include at least one camera situated on or proximal to an end surface of the scaffolding structure. In certain aspects, the one or multiple cameras include one or more cameras situated on or proximal to one or more side surfaces or sidewalls of the scaffolding structure. In certain aspects, the one or multiple cameras includes at least one camera situated on or proximal to the end surface of the scaffolding structure and one or more cameras situated on or proximal to one or more side surfaces or sidewalls of the scaffolding structure. In certain aspects, the scaffolding structure has a substantially rectangular shaped cross-section and the one or more side surfaces or sidewalls are substantially perpendicular to the end surface. In certain aspects, the one or multiple cameras include at least one camera situated on each side surface or sidewall of the scaffolding structure. In various aspects, the scaffolding may include 3, 4 or more side surfaces or sidewalls. In certain aspects, the scaffolding structure may include a single side surface or sidewall, e.g., wherein the scaffolding structure has a circular or elliptical cross-sectional shape or profile. In certain aspects, the scaffolding structure may include two side surfaces or sidewalls, e.g., one side surface having a linear profile and the other having semi-circular or semi-elliptical profile. In various aspects, the scaffolding may include 3 (e.g., triangular), 4 (e.g., rectangular) or more side surfaces or sidewalls.

In certain aspects, the extended field of view provides a field of view of up to 360° in a horizontal plane defined by the end portion of the scaffolding structure and/or up to about 270° in a vertical plane.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

BRIEF DESCRIPTION OF DRAWINGS

FIG. 4A illustrates an embodiment of a tactile sensor, which may be used as a robotic fingertip or other implement.

FIG. 5A and FIG. 5B illustrate an embodiment with cameras arranged to allow for 270° of sensitivity in the vertical plane, and 360° of sensitivity in the horizontal plane, respectively.

DETAILED DESCRIPTION

The following detailed description is exemplary in nature and is not intended to limit the embodiments or the application and uses of the embodiments disclosed. Furthermore, there is no intention to be bound by any expressed or implied theory presented in the following detailed description or the appended drawings.

According to various embodiments, optical tactile sensors are provided that offer a multi-directional field of view for sensing applications, and particularly robotic sensing applications.

Figure 1:
FIG. 1 illustrates an optical tactical sensor according to an embodiment.
Figure 2:
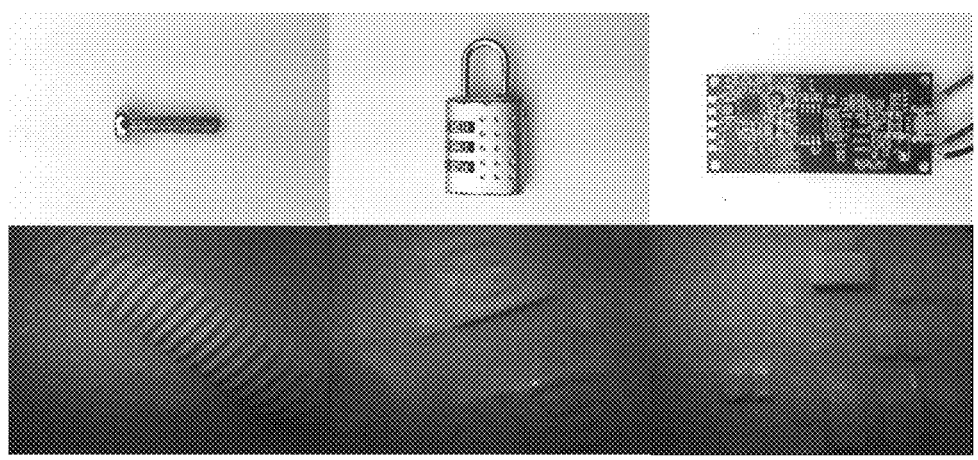
FIG. 2 shows an array of high-resolution images taken by a sensor according to an embodiment.
Figure 2:
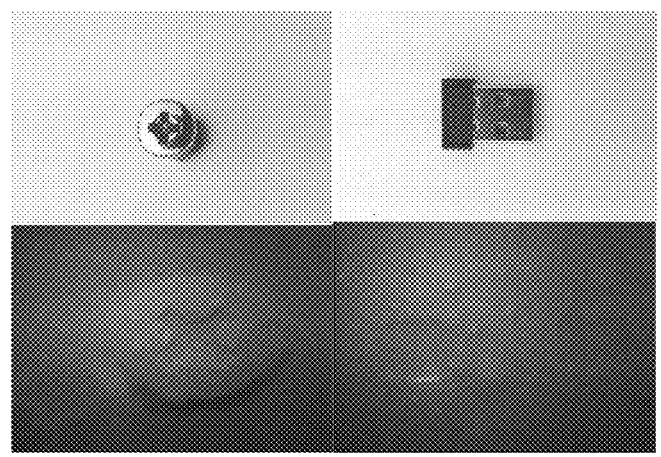
Figure 3:
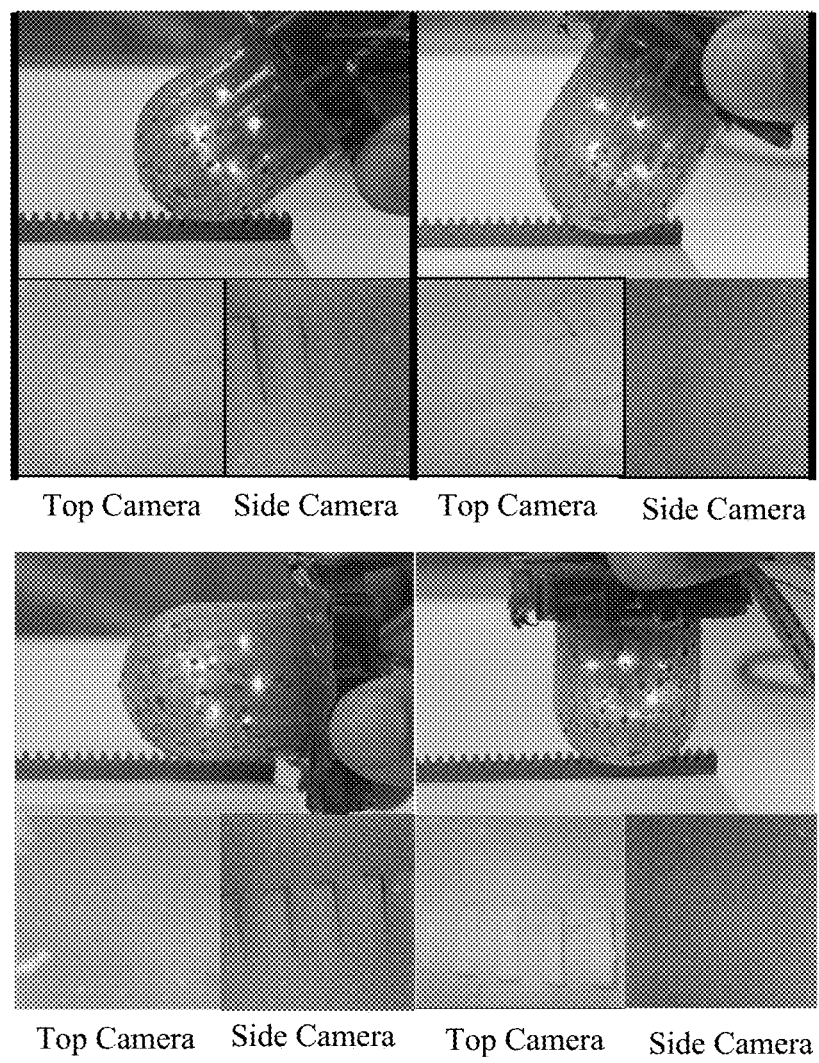
FIG. 3 shows an array of high-resolution images taken by a sensor, at various angles of sensor inclination, according to an embodiment.

FIG. 1 illustrates a tactical sensor 100 according to an embodiment. Sensor 100 advantageously combines the benefits of sensing on curved, e.g., strongly curved, surfaces with high resolution and accuracy. Additionally, tactile sensors according to the present embodiments are able to provide an array of high-resolution images (examples shown in FIGS. 2, 3). The signals can also readily be used in learning-based computer vision pipelines; learning-based methods have no difficulty extracting accurate state information from the signals.

FIG. 4A illustrates an embodiment of a tactile sensor 100, which may be used as a robotic fingertip or other implement. Sensor 100 includes a scaffolding structure configured to hold multiple elements thereon, e.g., one or more light sources, one or more cameras, circuitry, etc, as well as to function as a rigid or semi-rigid skeleton structure for a transparent elastomer (e.g., gel) skin. As shown, the scaffolding structure is substantially rectangular shaped and the side surfaces or sidewalls are substantially perpendicular to the end surface. In other embodiments, the shape of the scaffolding structure may be non-rectangular, and may take on any of a variety of geometries and cross-sectional shapes, e.g., may have curved surfaces and/or various surfaces meeting at angles other than 90°, such as a planar or curved conical structure with or without an end surface.

In order to allow sensitivity on the full surface of the fingertip, sensor 100 in the specific embodiment shown includes 5 micro-cameras positioned around the scaffolding structure, four cameras on the sidewalls and one camera on top (end surface), allowing a 360 degree field of view. The micro cameras in a particular embodiment have a resolution of 400×400 pixels and come with a micro lens assembled within. It should be appreciated that fewer or more cameras may be used with the same or differing resolutions. For example, in an embodiment, a single camera may be used. In another embodiment two or more cameras may be used. In an embodiment, the camera(s) are embedded directly into the gel, in contrast to typical realizations of the Gelsight sensor or other sensors, and no glass plate or air gap need be used in between the gel and the cameras allowing for a much more compact design. The total diameter of the embodiment shown is ~30 mm. It should be appreciated that the size may be different depending on the various components used, or the application. One or more light source(s), such as light emitting diodes (LEDs), may also be mounted or attached to the scaffolding structure. For example, in an embodiment, the light source(s) such as LEDs are mounted on a flexible PCB, which may be wrapped around or otherwise positioned and attached to the scaffolding structure, and are also embedded within the gel. FIGS. 7A-7D illustrate an embodiment of a flexible PCB structure including LED elements that may be used.

In an embodiment, the gel may be coated with a non-transparent layer that prevents ambient or environmental lighting from interfering with the measurements, and which also may enhance reflectivity of light from within the inner volume at the boundary between the gel and the coating. In an embodiment, to make the coating more durable and scratch-resistant, a fabric can be embedded into the coating. In certain embodiments, no coating is used. In another embodiment, only a single camera is included or used. It should be appreciated that arbitrary surfaces can be covered using a collection of one or more micro-cameras and LEDs embedded within the gel-skin.

Figure 4B:
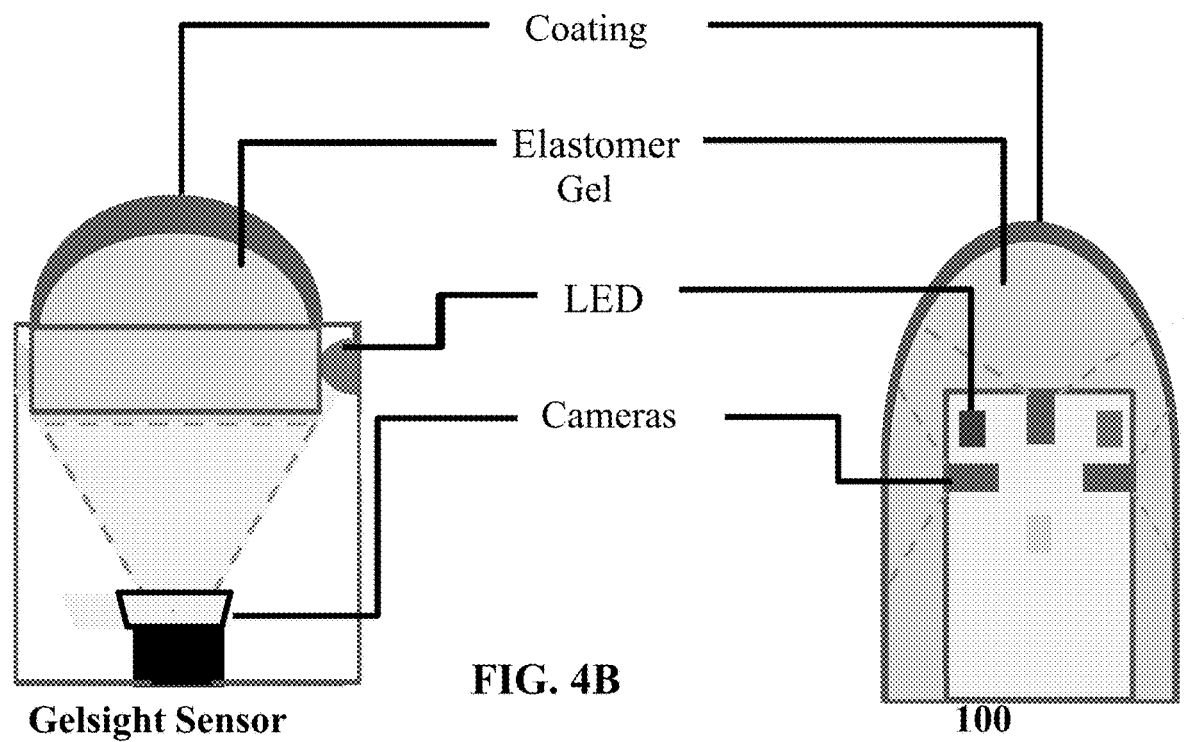
FIG. 4B illustrates a sensor embodiment next to a previous sensor.
Figure 4C:
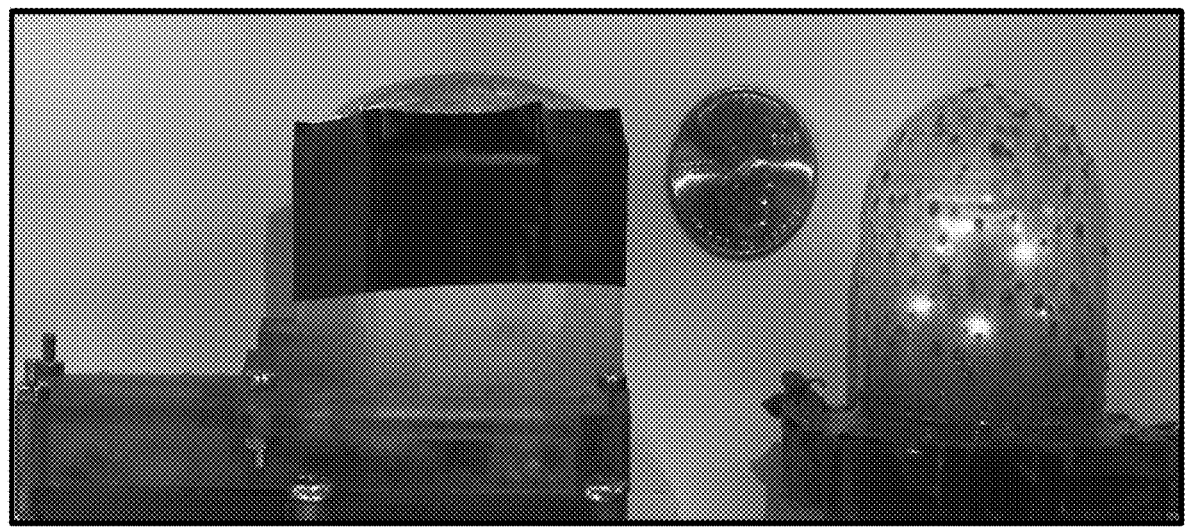
FIG. 4C shows an image of the sensor embodiment and the previous sensor of FIG. 4B

In certain aspects, an embodiment builds on the GelSight design which includes a camera that captures deformations on an elastomer slab. As illustrated in FIG. 4B, on the left side, the gel slab of a GelSight sensor is coated with a layer of reflective paint and illuminated by LEDs of different colors. An advantage of GelSight sensors over other tactile sensors is that the images provide a rich signal from which a wide range of relevant information, such as object geometry, grasp stability and object hardness can be extracted. The images from the camera can be used with standard convolutional networks, which have been tremendously successful in computer vision. Despite these advantages, the previous sensor designs are bulky (e.g., 35 mm×35 mm×60 mm), making it difficult to apply them to a wide range of applications. The GelSlim™ sensor integrates mirrors and light guides to make the sensor more compact, decreasing thickness to 20 mm. Like this design, a sensor according to an embodiment herein provides a more slim design (e.g., 30 mm diameter), while having sensitivity on all sides, whereas GelSlim is only sensitive on one side. A unidirectional version of an embodiment of a sensor herein, in contrast, only measures about 15 mm in thickness.

Sensors that only provide sensitivity on one side restrict the complexity of the tasks that can be performed. While a unidirectional sensor can be mounted inside a parallel jaw gripper to face the opposing finger, which is sufficient for grasping, it cannot be used for tasks such as localizing a particular screw when reaching into a box filled with screws. A fingertip that is sensitive on all sides can be used on robotic hands in tasks where contacts on multiple sides of the fingertip may occur, for example when grasping a cup or pressing a button. Integrating multi-directionality into existing GelSight sensor designs may be challenging, due to the lack of space on robotic grippers.

The present sensor embodiments, for example sensor 100 shown in FIG. 4B on the right, advantageously tackle this challenge using one or more micro-cameras, allowing for integrated multi-directionality. Rather than using cameras to sense the deformation of the gel skin, multi-directional sensors may be included that use arrays of photodiodes to allow covering curved surfaces such as robotic fingertips. However, using single sensing elements, such as photo diodes, may not allow the same spatial resolution as camera chips. An example of a multi-directional sensor based on capacitive sensing is the BioTac™ sensor, which features similar dimensions to a human finger, providing sensitivity on its tip and side. The BioTac uses an array of 19 electrodes and thermistors, providing far lower resolution than cameras used in the sensor embodiments herein.

To evaluate a present design, a comparison was made to a conventional flat GelSight sensor on several tactile state estimation and localization tasks. A state estimation benchmark task is provided, particularly for a multi-directional sensor where a robot needs to localize its finger relative to another object by making contact with it, to show that the present sensors allows for comparable accuracy, while at the same time covering a significantly wider range of the state space.

Similar to the GelSight sensor, the present sensor uses cameras to record the deformation of a gel skin coated with a reflective layer. However, unlike the GelSight sensor, which has a limited view, the present sensor advantageously provides for sensing on all sides of a rounded fingertip, using one or multiple (e.g., three, four, five or more) micro-cameras, as illustrated in FIG. 4B on the right (only three cameras shown in cross sectional view; one or two additional cameras may be located on (opposite) sides to view locations perpendicular/normal to the cross-sectional plane shown. Moreover, in an embodiment, the gel is not mounted on top of a support plate as in the GelSight sensor, but rather the gel positioned or casted directly around the cameras to reduce the size of the sensor.

Cameras

An important factor determining the size of an optical touch sensor is the choice of camera(s) and their arrangement relative to the gel. The camera(s) may be chosen to have the maximum possible field of view and the smallest possible minimal focus distance (the minimal focus distance is the smallest distance between an object and the lens at which the object remains in focus). Cameras with wider fields of view observe larger portions of the sensor's surface area, thus minimizing the total number of cameras required to obtain full coverage of the inner surface (e.g., from within gel) of the sensor. Small minimum focus distances allow for a reduction in the thickness of any gel skin and the sensor diameter. Commercially available endoscope cameras provide a good match to these requirements; one example is the 200A CMOS cameras from Shenzhen Eastern International Corporation. While the company claimed better specifications, testing found that each camera has a minimum focus distance of 5 mm, a field of view of 90° and measures 1.35×1.35 mm on the sides and 5 mm in length, enabling a very compact arrangement of the cameras. An example of the size of the cameras in relation to the camera mount is illustrated in FIG. 6A-FIG. 6D. As shown in FIG. 5A and FIG. 5B, in an embodiment, the cameras are arranged to allow for 270° of sensitivity in the vertical plane and 360° of sensitivity in the horizontal plane, excluding possible small blind spots. Any blind spots can be reduced, for example, by choosing lenses with slightly larger field of view.

Illumination

Figure 7A:
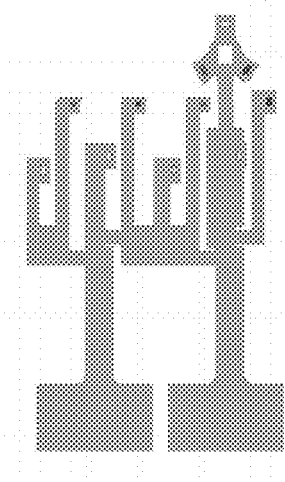
FIGS. 7A, 7B, 7C and 7D illustrate an embodiment of a flexible PCB structure including LED elements that may be used.
Figure 7B:
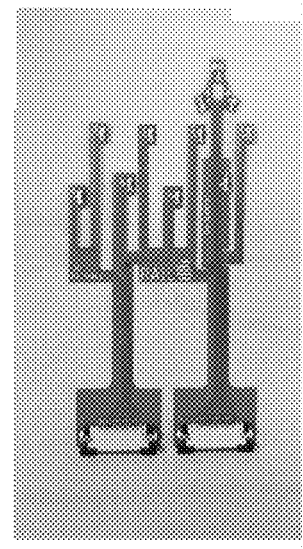
Figure 7C:
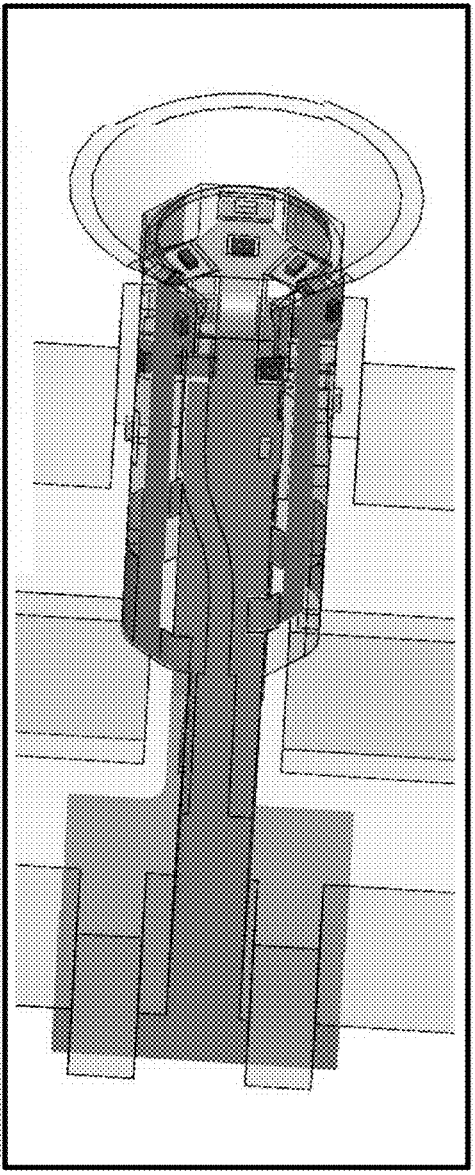
Figure 7D:
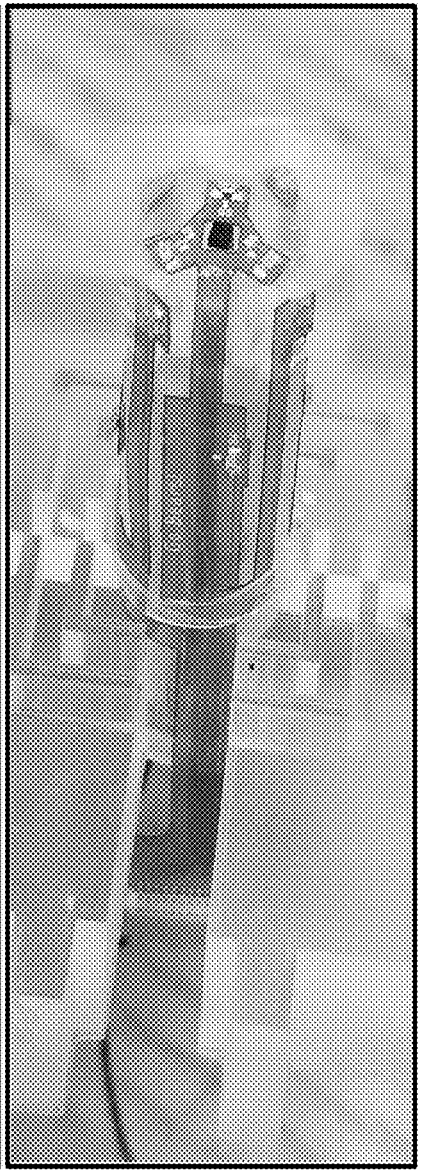

To optimally detect deformations of the gel in the camera images, the inner surface of the gel should be illuminated as evenly as possible. It is advantageous to illuminate the surface with light of different colors from different directions. In principle, this would allow estimating the directions of surface normals. However, in an embodiment, the present sensors can be used for state estimation without explicit estimation of normals or geometry by using a learning-based approach, which directly estimates the state from the camera images. As shown in FIG. 7C, for example, a three color source, such as 3 LEDs, may be located adjacent to each camera, with colors red, green and blue which illuminate the gel with red, green, and blue light from different directions. Keeping a distance between the LEDs guarantees that the surface is illuminated in different colors coming from different directions. The red, blue, and green LEDs may be equally spaced from the cameras, ensuring equal distribution of light in the camera image.

In an embodiment, all LEDs are permanently on, which means that light from different LEDs positioned near different cameras overlaps. It has been found that despite this overlap the tactile images still provide a high-quality signal from which learning-based state estimation, as below can be performed at high accuracy.

In an embodiment, fiber optic cables are used to illuminate the inner surface of the gel. For example, a fiber optic cable may be deployed within the scaffolding structure with an illumination end portion (including window or lens element) located at or proximal to the surface of the scaffolding structure. Fiber optic cable illumination advantageously reduces costs as a flexible PCB is not needed, and advantageously reduces size requirements as LEDS can be moved off the sensor and light can be transmitted from the LEDs (or other light sources) to the inside surface of the sensor through the fiber optic cables.

In another embodiment, white light sources are used instead of RGB light. In this embodiment, no reflective coating at the sensor (gel) surface is needed. The RGB lighting is primarily used for generating 3D reconstructions of deformations using a technique called photometric stereo; removing the coating and the RGB lights enables the cameras to see past the sensor's surface and also allows the cameras to capture the true colors of objects that the sensor comes in contact with.

Camera Mount

In certain embodiments, the present sensors use a custom-designed camera mount to support the cameras and LEDs for illumination. The mount may be designed to minimize blind spots and sensor size, while allowing for easy assembly by hand. The top-facing camera may slide in through the z-axis channel (see, e.g., FIG. 6A), whereas the side cameras may be inserted through x and y axis channels (see, e.g., FIG. 6C). To increase the mechanical stability of the fingertip and the gel, a thin cone structure may be added round the top of the camera mount, which also helps reduce interference between the lighting from the LEDs near the top camera and those of the side-facing cameras.

Sensor Fabrication

Figure 6A:
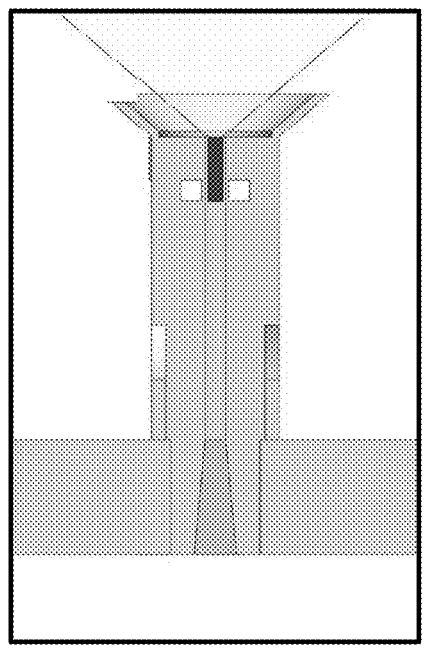
FIG. 6A illustrates a top-facing camera slid in through a z-axis channel of a scaffolding structure according to an embodiment. whereas the side cameras may be inserted through x and y axis channels
Figure 6B:
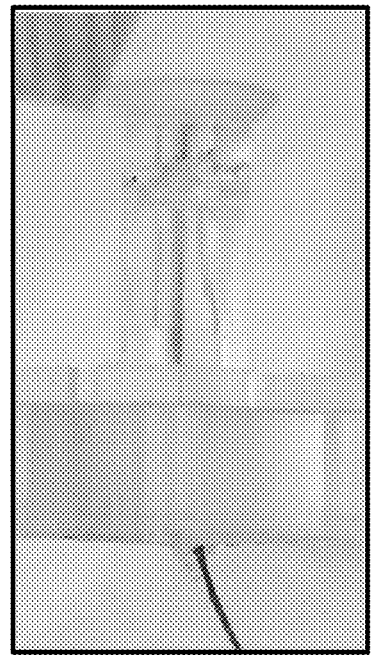
FIG. 6B illustrates a camera mount according to an embodiment.
Figure 6C:
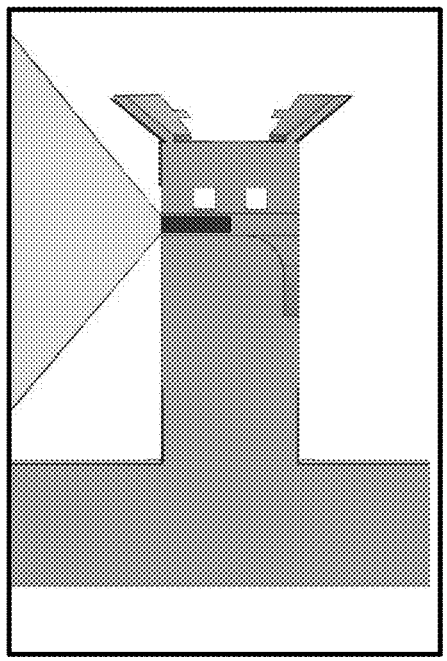
FIG. 6C illustrates a side-facing camera slid in through an x (or y) axis channel of a scaffolding structure according to an embodiment.
Figure 6D:
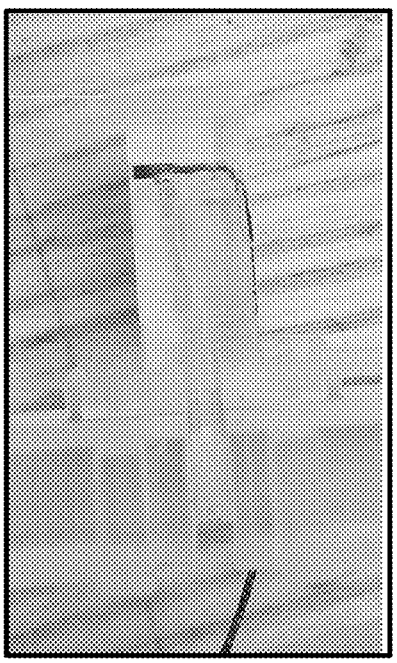
FIG. 6D illustrates a camera mount according to an embodiment.

The camera mount of the sensor, e.g., shown in FIG. 6B and FIG. 6D, may be 3D printed, for example using Formlab's stereo-lithography (SLA) printer, the Form 2, allowing to print with high resolutions (e.g., ~50 Microns). The Form 2 enabled manufacture of minute features such as the camera channels (e.g., 1.45 mm×1.45 mm). A custom designed and manufactured flexible PCB may be used for mounting the LEDs around the cameras.

Assembly Process

An initial step in the assembly process is to insert the micro cameras and secure them, e.g., by gluing the cables down in the channels, e.g., with E6000 glue, a silicon based adhesive. Another step is to position, wrap, and glue the flexible PCB around the camera mount. After the glue sets, the camera mount may be secured to a mold and filled with silicone rubber. After removing the cured silicone rubber finger from the mold, the sensor may be coated.

Sensor Coating

In an embodiment, an aluminum powder, e.g., 1 μm aluminum powder, is mixed with the same silicone rubber as used for the gel-skin. A solvent is added to the mix to decrease viscosity. The coating is then completed by pouring or coating the mix over the sensor surface.

In an experimental evaluation, the present sensors were studied to determine how they can be used to perform tactile state estimation. This is a particularly appealing application of multi-directional tactile sensing: a robotic finger with multi-directional sensing can make contact with objects at a variety of points and angles, and therefore should be able to localize objects in a broader range of the state space. The specific tasks that were studied include localization of a corner, shown in FIG. 8, and estimation of the angle of contact on a flat surface, shown in FIG. 9. For both tasks, the present sensor was compared with a standard GelSight sensor, which is sensorized only on a flat surface. Since the present sensor is nearly symmetric across the four sides, characterize was done using only two cameras, one of the side cameras and the top camera.

Corner Localization

Localizing corners is a state estimation problem which can be encountered in a variety of manipulation scenarios, especially in assembly tasks. For example, the task might be to detect whether a part has been mounted correctly on another part, which can be accomplished by estimating the location of the corner between the parts.

Figure 8:
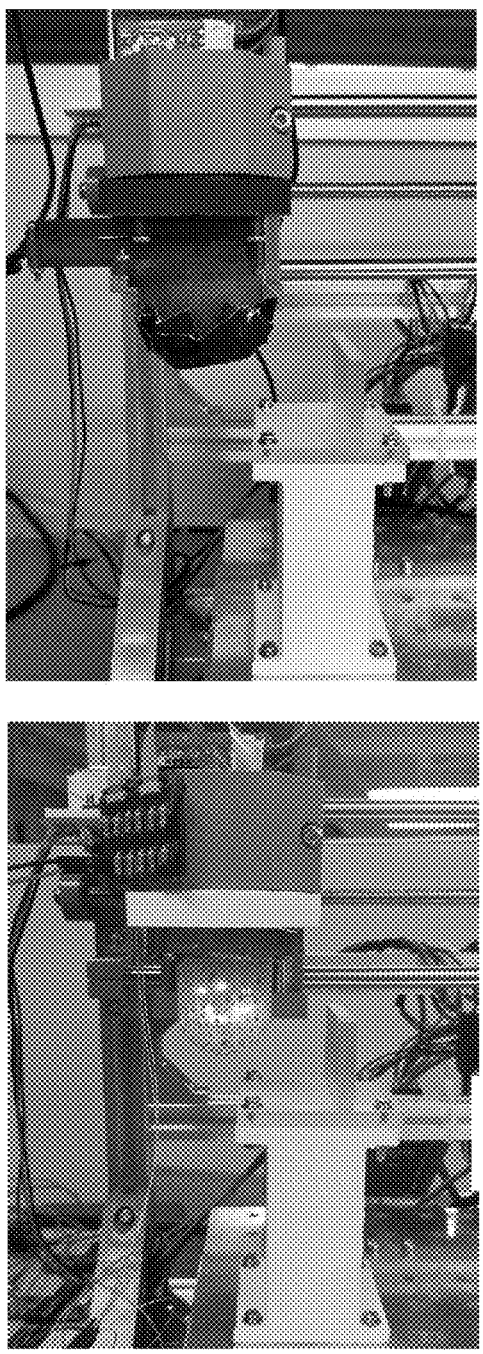
FIG. 8 illustrates an experimental setup for estimating the location of a corner.
Figure 8:
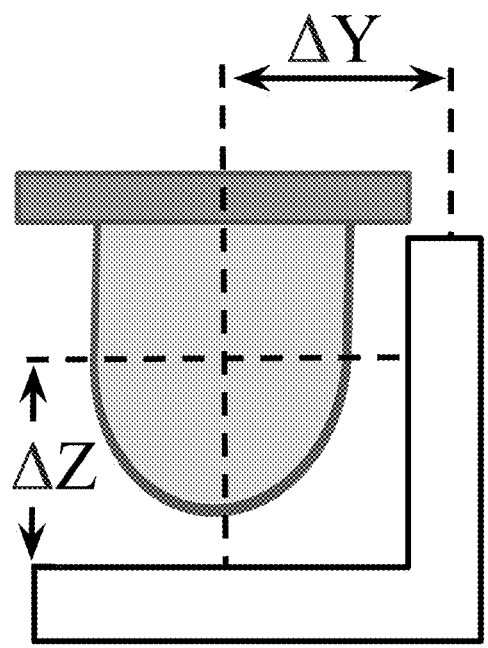

FIG. 8 illustrates the experimental setup for estimating the location of the corner. 1000 images were collected by applying random displacements in z and y in a range of 0-8 mm to the end-effector, allowing it to touch both faces of the corner. To increase reproducibility of the experiments, the displacement in the z-direction was applied first and then the displacement in the y-direction was applied. Since the uni-directional GelSight sensor has a flat sensitive area, its sensitive area can only contact with one of the faces of the corner, in this case, the lower edge. However, using a uni-directional sensor, somewhat accurate estimates of displacements in y direction were expected, since after touching down the gel-skin deforms laterally, providing image features that can be used to estimate y-displacements.

Neural Network Architecture and Training

State estimation was performed by feeding the tactile images into a deep convolutional neural network and regressing displacements. A modified version of the ResNet 50 architecture was used, where the top layer is removed and the flattened features are inputted to four hidden fully-connected layers of 512, 256, 256, and 256 nodes respectively. The ResNet layers are initialized with weights pre-trained on the ImageNet dataset. These pre-trained parameters are fine-tuned during training. For the experiments with the present sensor, the ResNet features produced by the images from the two cameras are flattened and concatenated. The network is trained with the Adam optimizer using a mean-squared-error loss for 100 epochs.

Results for Corner Localization

Table I shows the median position estimation accuracy in z and y directions, as well as the inter-quartile ranges on held-out validation set examples. The experiments indicate that while in z-direction both sensors have comparable accuracy, the present sensor achieves higher accuracy in y-direction, thanks to the additional camera facing the vertical edge. One might wonder why the GelSight sensor still obtains an accuracy of around 0.9 mm in y-direction despite never touching the vertical edge with its sensitive area. The reason for this, as mentioned above, is during data collection the displacement in z-direction is applied first and then the displacement in the y-direction is applied, allowing the sensor to capture lateral displacement of the gel due to shear forces.

TABLE I

|  | Median abs. error (IQR) z | Median abs. error (IQR) y |
|---|---|---|
| Embodiment | 0.511 (0.602) | 0.626 (0.778) |
| Gelsight | 0.315 (0.444) | 0.938 (1.222) |

Estimating the Angle of Contact

Figure 9:
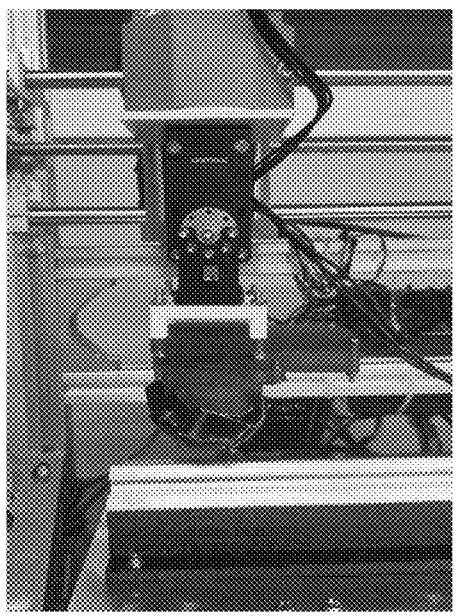
FIG. 9 illustrates an experimental setup for estimating the angle of contact on a flat surface.
Figure 9:
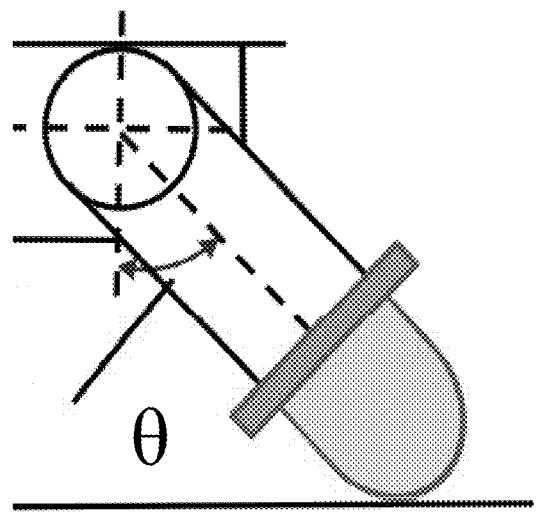
Figure 9:
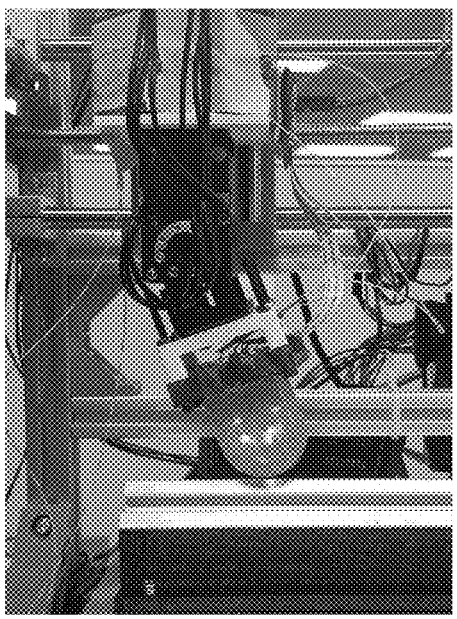

For estimating grasp stability, for robotic manipulation using robot hands, and in particular for in-hand manipulation, it is necessary to estimate the angle of contact between the fingers and the object surface. To simulate how a fingertip of a robot hand would come into contact with an object at different angles, a state estimation task was set up where the tactile sensor is mounted on a rotary actuator attached to the end-effector of a CNC machine. The end-effector can then be moved to press the sensor against the object, in this case, a 2020 aluminum extrusion rotated so that the sensor presses against a rounded edge. The setup is illustrated in FIG. 9. For estimating the angle of contact, the same network architecture and training scheme as in the other state estimation task was used.

To collect the data, the tactile sensor is rotated to a random angle in a specified range and the sensor is lowered in z-direction until it contacts the aluminum rail. Since the travel range of the CNC machine is restricted, data in three different angle ranges was collected, from 0° to 22.5°, 22.5° to 60°, and 60 to 90°. In each range, 1000 samples were collected where the rotary actuator is driven to a random angle with the respective range.

The results of the angle estimation task are given in Table II, showing that then present sensor achieves comparable accuracy in the range of 0° to 22.5° and in the range of 22.5° to 60°. It is surprising that although the GelSight sensor does not touch the rail with its sensitive area in the range of 22.5° to 60° the network is still able to correctly estimate the angle. It is hypothesized that this is due to the plastic housing of the sensor deforming when pressed against the rail, causing the gel to shift by a small amount enough to be captured by the camera.

TABLE II

| | Median abs. error (IQR) 0° to 22.5° | Median abs. error (IQR) 22.5° to 60° | Median abs. error (IQR) 60° to 90° |
|---|---|---|---|
| Embodiment | 1.142 (1.665) | 1.986 (3.022) | 1.248 (1.683) |
| Gelsight | 0.325 (0.376) | 1.899 (2.915) | N/A |

The results show that the present sensor provides high sensitivity in a variety of different contact conditions, while the GelSight sensor provides comparable sensitivity presumably due to deformations of the sensor housing.

One advantage of the present embodiments is that they provide a universal tactile sensor that increases the capabilities of robot manipulation by providing a more accurate and comprehensive information about the contact state between the robot and its environment. Furthermore, the sensor is easy to manufacture. Advantages of the present embodiments also include high resolution, a small, thumb-like form factor and omni-directional sensing.

High resolution. The sensor provide rich signals from which features relevant for control, such as object positions, can be extracted accurately. Achieving high spatial resolution has proven challenging with capacitive, resistive, or photo-diode-based sensors. However, the resolution of camera-based sensors is limited only by the resolution of the camera and the sensitivity of the sensor skin.

Thumb-like form factor. It is important for the sensor to fit into robot fingertips. In many cases, the size of the fingertip restricts the possible tasks it can be used for. For example, a large manipulator may have difficulty picking up small or thin objects such as plates or forks.

Omni-directional sensing. Sensitivity on multiple sides enables the estimation of contacts in a wider range of settings. While sensitivity on the inner surface between fingers is necessary for grasping, sensitivity on the other sides can be crucial for localizing objects of interest, or for performing non-prehensile manipulation.

Relative to the GelSight sensor and other sensors, the present embodiments offer many advantages and distinctions, including for example:
1) the present embodiments offer a multi-directional field of view, e.g., up to 360°;
2) the surface of the present embodiments may be curved, similarly to human fingers, instead of flat;
3) in the present embodiments, the gel may be directly cast on top of the cameras, which results in a more compact form factor compared to previous sensors, as the support plate is entirely removed, thus advantageously eliminating any empty spaces between the camera and the gel.

Example Applications and Uses

The various tactile sensor embodiments herein are useful for various applications in various environments, including in unstructured environments in which visual feedback may be difficult or insufficient for orientation to surroundings, such as in minimally-invasive surgery (MIS) or autonomous robotics applications. Additional applications and uses for tactile sensors according to embodiments herein include general or specific robotic manipulators, prosthetics, physical therapy, studying biological systems, agricultural robotics, food processing robotics, automotive design and engineering, consumer products such as keyboards, gaming controls and toys or stuffed animals that are responsive to touch inputs, avatars and androids, sports training, and others as will be apparent to one skilled in the art.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the embodiments (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosed embodiments and does not pose a limitation on the scope of the disclosure unless otherwise claimed. No language in the specification should be construed as indicating any non-claimed element as essential to the practice of the embodiments.

Exemplary embodiments are described herein. Variations of those exemplary embodiments may become apparent to those of ordinary skill in the art upon reading the foregoing description. The inventors expect skilled artisans to employ such variations as appropriate, and the inventors intend for the embodiments to be practiced otherwise than as specifically described herein. Accordingly, the scope of the disclosure includes all modifications and equivalents of the subject matter recited herein and in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. An optical tactile sensor, comprising:
   a scaffolding structure;
   a transparent elastomer material covering at least an end portion of the scaffolding structure; and
   one or multiple cameras situated on the end portion of the scaffolding structure and embedded within the transparent elastomer material, wherein the one or multiple cameras are situated so as to provide an extended field of view about the end portion of the scaffolding structure, wherein the one or multiple cameras include one or more cameras situated on one of more side surfaces of the scaffolding structure.

2. The optical tactile sensor of claim 1, further including one or more light sources situated on the end portion of the scaffolding structure and embedded within the transparent elastomer material, wherein the one or more light sources are configured to illuminate an interior of the transparent elastomer material.

3. The optical tactile sensor of claim 2, wherein the one or more light sources comprise one or more light emitting diodes (LEDs).

4. The optical tactile sensor of claim 2, wherein the one or more light sources are situated on a flexible PCB structure, and wherein the flexible PCB structure is attached to the end portion of the scaffolding structure.

5. The optical tactile sensor of claim 2, wherein the one or more light sources comprise one or more fiber optic cables.

6. The optical tactile sensor of claim 2, wherein the one or more light sources comprise one or more white light sources.

7. The optical tactile sensor of claim 2, wherein the one or more light sources comprise one or more RGB light sources.

8. The optical tactile sensor of claim 1, further including a non-transparent material layer disposed on at least a portion of an outer surface of the transparent elastomer material.

9. The optical tactile sensor of claim 8, wherein the non-transparent material layer includes a fabric material.

10. The optical tactile sensor of claim 1, wherein the one or multiple cameras include at least one camera situated on an end surface of the scaffolding structure.

11. The optical tactile sensor of claim 1, wherein the scaffolding structure is substantially rectangular shaped and wherein the one or more side surfaces are substantially perpendicular to the end surface.

12. The optical tactile sensor of claim 1, wherein the one or multiple cameras include at least one camera situated on each side surface of the one or more side surfaces of the scaffolding structure.

13. The optical tactile sensor of claim 1, wherein the extended field of view provides a field of view of up to 360° in a horizontal plane defined by the end portion of the scaffolding structure and/or up to about 270° in a vertical plane.

14. An optical tactile sensor, comprising:
    a scaffolding structure having an end portion including an end surface and at least one sidewall;
    a transparent elastomer material covering at least the end portion of the scaffolding structure; and
    one or multiple cameras situated on the end portion of the scaffolding structure and embedded within the transparent elastomer material, wherein the one or multiple cameras are configured to provide an extended field of view about the end portion of the scaffolding structure, wherein the one or multiple cameras include one or more cameras situated on the at least one sidewall of the scaffolding structure.

15. The optical tactile sensor of claim 14, further including one or more light sources situated on the end portion of the scaffolding structure and embedded within the transparent elastomer material, wherein the one or more light sources are configured to illuminate an interior of the transparent elastomer material.

16. The optical tactile sensor of claim 14, wherein the one or multiple cameras include at least one camera situated on the end surface of the scaffolding structure.

17. The optical tactile sensor of claim 14, wherein the extended field of view provides a field of view of up to 360° in a horizontal plane defined by the end surface of the scaffolding structure and/or up to about 270° in a vertical plane.

18. An optical tactile sensor, comprising:
    a scaffolding structure;
    a transparent elastomer material covering at least an end portion of the scaffolding structure; and
    one or multiple cameras situated on the end portion of the scaffolding structure and embedded within the transparent elastomer material, wherein the one or multiple cameras are situated so as to provide an extended field of view about the end portion of the scaffolding structure, wherein the extended field of view provides a field of view of up to 360° in a horizontal plane defined by the end portion of the scaffolding structure and/or up to about 270° in a vertical plane.

19. The optical tactile sensor of claim 18, further including one or more light sources on the end portion of the scaffolding structure and embedded within the transparent elastomer material, wherein the one or more light sources are configured to illuminate an interior of the transparent elastomer material.

20. The optical tactile sensor of claim 18, further including a non-transparent material layer disposed on at least a portion of an outer surface of the transparent elastomer material.

* * * * *